United States Patent [19]

Marten et al.

[11] Patent Number: 4,549,806
[45] Date of Patent: Oct. 29, 1985

[54] METHOD AND APPARATUS MEASURING ABSOLUTE ROTATION

[75] Inventors: Peter Marten, Blaustein-Dietingen; Klaus Petermann, Ulm, both of Fed. Rep. of Germany

[73] Assignee: Licentia Patent-Verwaltungs-GmbH, Frankfurt am Main, Fed. Rep. of Germany

[21] Appl. No.: 432,375

[22] Filed: Sep. 30, 1982

[30] Foreign Application Priority Data

Oct. 9, 1981 [DE] Fed. Rep. of Germany ....... 3140110

[51] Int. Cl.⁴ .................... G01B 9/02; G01C 19/64
[52] U.S. Cl. .................................................. 356/350
[58] Field of Search ........................................ 356/350

[56] References Cited

U.S. PATENT DOCUMENTS 4,138,196 2/1979 Redman .............................. 356/350
4,326,803 4/1982 Lawrence ........................... 356/350

FOREIGN PATENT DOCUMENTS 2028496 3/1980 United Kingdom ................ 356/350

Primary Examiner—Vincent P. McGraw
Attorney, Agent, or Firm—Spencer & Frank

[57] ABSTRACT

Method for measuring absolute rotation with the aid of a light conductive fiber ring interferometer including a light source, a beam dividing arrangement, a light path formed by a light conductive fiber coil, an optical phase modulator which is disposed in the light path and which modulates the light circulating in the light path with a periodic, optical phase modulation at a fundamental frequency $f_0$, and a photodetector for providing an electrical output signal. The light circulating in the light path or an electrical output signal from the photodetector is modulated with at least one mixing frequency $f_2$ in a manner such that an electrical evaluation signal results which has an evaluation frequency $f_1$ which is smaller than that of the fundamental frequency $f_0$ and which is evaluated to determine the absolute rotation of interest.

18 Claims, 3 Drawing Figures

METHOD AND APPARATUS MEASURING ABSOLUTE ROTATION

BACKGROUND OF THE INVENTION

The present invention relates to a method and an apparatus for measuring absolute rotation with the aid of a light conductive fiber ring interferometer.

Another name for a light conductive fiber ring interferometer is, fiber-optic laser gyro which is described by R. F. Cahill et al: "Phase-nulling fiber-optic laser gyro", Optics Letters, March 1979, Vol. 4, No. 3, p. 93–95, and by R. Ulrich: "Fiber-optic rotation sensing with low drift", Optic Letters, May 1980, Vol. 5, No. 5, p. 173–175.

A prior art light conductive fiber ring interferometer is shown schematically in FIG. 1. The light from a light source Q is fed to a beam dividing arrangement T including gates or parts T1 to T4. The divided light beam exiting via gates T1 and T2 travels into both ends of a light path L formed of a light conductive fiber coil. After passing through light path L, the light beams are combined again in beam dividing arrangement T and the thus produced combined optical output signal at gate T3 is finally received by a photodetector D and converted into an electrical signal which is evaluated to determine the rotation of interest.

In light path L, the optical phase of the light is modulated by a phase modulator Ph by the amount $\delta\phi(t)$, with the phase modulator Ph being actuated by a periodic, preferably sinusoidal signal at the fundamental frequency $f_O$, so that the following applies:

$$\delta\phi(t) = \phi_0 \cdot \sin(2\pi f_O t)$$

On the basis of this modulation, the light recieved by photodetector D is also modulated so that the following sequence develops for its light power $P_D$:

$$P_D = C \cdot P_Q \{1 + J_0(\psi) \cdot \cos(2\Delta\phi) + 2 \cdot J_1(\psi) \cdot \sin(2\Delta\phi) \cdot \cos(2\pi f_0(t - \tau/2)) + 2 \cdot J_2(\psi) \cdot \cos(2\Delta\phi) \cdot \cos(2\pi \cdot 2f_0(t - \tau/2)) + \ldots\} \quad (1)$$

where the effective phase variation or swing $\psi$ is defined by, $$\psi = 2\phi_0 \cdot \sin(\pi f_0 \tau),$$

the light source Q has a power $P_Q$, C is a constant, $\Delta\phi$ is the Sagnac phase shift, $J_O$, $J_1$, $J_2$ are Bessel functions and $\tau$ is the difference in travel time between the light travel times from gates T1 and T2 to the phase modulator Ph. The Sagnac phase shift $\Delta\phi$ is proportional to the rate of rotation to be measured so that such rotation can be determined by measuring the Sagnac phase shift.

The power $P_Q$ of light source Q in the prior art arrangement is unmodulated and constant so that the Sagnac phase shift $\Delta\phi$ can be determined, for example, from the optical output signal at gate T3. That is, the signal amplitude $A_1 = C \cdot P_Q \cdot 2 \cdot J_1(\psi) \sin(2\Delta\phi)$ associated with the fundamental frequency $f_O$ and the signal amplitude $A_2 = C \cdot P_Q \cdot 2J_2(\psi) \cos(2\Delta\phi)$ associated with the second harmonic $2f_O$ are initially determined from the optical output signal at gate T3 and thereafter, the quotient $$\frac{A_1}{A_2} = \frac{J_1(\psi)}{J_2(\psi)} \tan(2\Delta\phi) \quad (2)$$

may be formed, for example, with a corresponding electrical circuit. This quotient depends only on the Sagnac phase shift, and on the effective phase variation $\psi$, which latter quantity can be kept at a constant value with, for example, a regulating arrangement. Therefore, according to equation (2), the Sagnac phase shift $2\Delta\phi$ can be determined with great accuracy from a measurement of the quotient $A_1/A_2$.

Optimum modulation conditions result if the fundamental frequency $f_O$ of the phase modulator Ph is selected to conform to $f_O = 1/(2\tau)$. This fundamental frequency $f_O$, however, has such a high value that evaluation of the electrical output of photodetector D is made more difficult. For example, for a light path L having a light conductive fiber length of 1 km, there results a fundamental frequency $f_O = 100$ kHz. With shorter fiber lengths, the fundamental frequencies are even higher.

For very precise signal processing it is desirable to arrange an electrical analog/digital converter immediately after the photodector D, if possible, or at least through only the intermediate connection of a preamplifier, so that further signal processing can be performed purely digitally until the rate of rotation is obtained. The stated high fundamental frequencies of several hundred kHz can be processed with present-day highly accurate analog/digital converters only in a complicated and therefore expensive manner since conversion times on the order of magnitude of 1 $\mu$s are required.

SUMMARY OF THE INVENTION

It is therefore the object of the present invention to provide a method and aparatus for measuring absolute rotations according to the above-mentioned type which method and apparatus make it possible in a cost-effective manner to measure absolute rotation accurately and without susceptibility to interference and, particularly, to perform a digital evaluation.

The above and other objects of the invention are accomplished in accordance with the present invention wherein a method is provided for measuring absolute rotation with the aid of a light conductive fiber ring interferometer including a light source for producing a light beam, a light beam dividing arrangement, a light path connected to the beam dividing arrangement and formed by a light conductive fiber coil, an optical phase modulator disposed in the light path, and a photodetector. The method includes dividing the light beam produced by the light source into two light beam signals by means of the beam dividing arrangement; feeding the two light beam signals to the respective ends of the light path to circulate the two light beam signals through the light path in opposite directions; phase modulating the light signals circulating in the light path with a periodic optical phase modulation at a fundamental frequency $f_0$; combining the light signals exiting from the two respective ends of the light path to provide a combined optical output signal; detecting the combined optical output signal, by means of the photodetector, to provide an electrical output signal; modulating at least one of the above-mentioned signals with a mixing frequency $f_2$ such that an electrical evaluation signal having an evaluation frequency $f_1$ which is less than the fundamental frequency $f_O$ is produced on the output side of the photodetector; and evaluating the electrical evaluation signal to determine the absolute rotation.

According to the invention, either the light circulating in the light path is modulated with the mixing frequency $f_2$ such that the electrical output signal produced by the photodetector contains the evaluation frequency $f_1$ and constitutes the electrical evaluation signal, or the electrical output signal of the photodetector is modulated with the mixing frequency $f_2$ such that an electrical signal is produced which has the evaluation frequency $f_1$ and which constitutes the electrical evaluation signal.

According to the preferred embodiment of the invention, the periodic optical phase modulation is sinusoidal, and the light circulating in the light path is modulated with the mixing frequency $f_2$ by modulating the intensity of the light produced by the light source with a periodic signal containing the mixing frequency $f_2$.

Advantageously, few complicated, and therefore expensive, electro-optical components are required to build the light conductive fiber ring interferometer according to the invention. With such a measuring arrangement, the reliability is increased and its tendency to malfunction is reduced.

BRIEF DESCRIPTION OF THE DRAWINGS

The present invention will now be explained in greater detail with the aid of the accompanying drawings in which.

DESCRIPTION OF THE PREFERRED EMBODIMENTS

Figure 1:
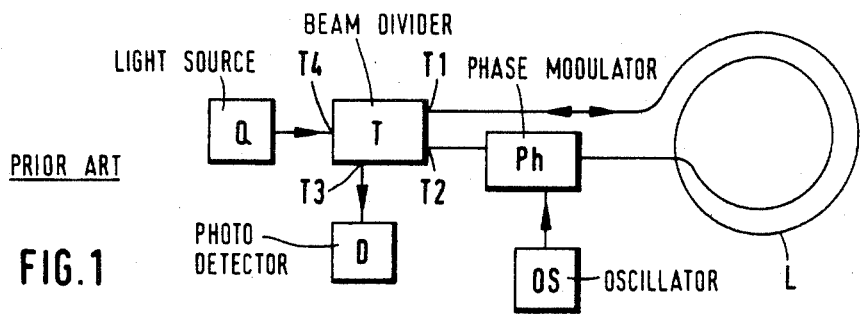
FIG. 1 is a schematic of a prior art light conductive fiber ring interferometer.
Figure 2:
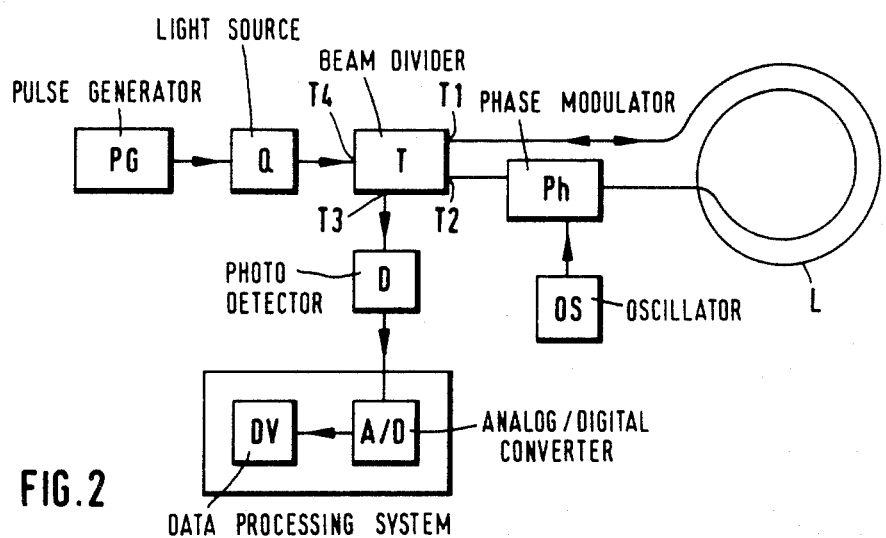
FIG. 2 is a schematic of one embodiment of a light conductive fiber ring interferometer in accordance with the present invention.

FIG. 2 shows a schematic of a first embodiment of the invention in which the intensity of the light, as well as its phase, is modulated on light path L. In FIG. 2, elements performing the same function as in FIG. 1, previously described in connection with the prior art, are given like reference characters.

As in FIG. 1, light source Q in FIG. 2 emits a light beam which enters beam divider T through gate T4 where it is divided into first and second beams. These beams pass through gates T1 and T2, circulate through fiber coil L in opposite directions and re-enter beam divider T via gates T2 and T1, respectively, where they are combined to produce an optical output at gate T3.

Phase modulator Ph, disposed in the light path L, is actuated by an electrical oscillator OS in such a manner that a periodic, preferably sinusoidal, optical phase modulation at the fundamental frequency $f_O$ results.

Light source Q, which may, for example, be a light emitting diode or a semiconductor laser diode, is electrically actuated by an electrical frequency and/or pulse generator PG so that intensity modulated light is emitted in which the modulation frequency is equal to a mixing frequency $f_2$.

According to equation (1), two modulated components result, namely, the modulation of the power $P_Q$ at mixing frequency $f_2$ and the optical phase modulation produced by phase modulator Ph, which is considered by the curved bracket in equation (1). By multiplying these two components, mixed products result so that, for example, the signal amplitude $A_1$ can be determined at not only the fundamental frequency $f_O$, but also at an evaluation frequency $f_1 = |f_2 - f_O|$. By appropriately selecting the mixing frequency $f_2$, it is possible to have an evaluation frequency $f_1$ which is substantially lower than the fundamental frequency $f_O$ and is therefore susceptible to digital signal processing.

If now, according to a further feature of the invention, the modulated light contains not only the frequency component $f_2$, but also at least the frequency component $2f_2$, the signal amplitude $A_2$ can also be determined easily by determination of the signal amplitude at the frequency $2f_1 = |2f_2 - 2f_O|$.

According to a still further feature of the invention, the above-mentioned frequency components result if light source Q emits periodically repeated light pulses at mixing frequency $f_2$ with a pulse length which is short compared to the period of duration. Such light pulses can be generated very easily if a light emitting diode or a semiconductor laser diode is used as the light source, with its electrical actuating current having corresponding pulses.

An electrical analog/digital converter (A/D) is connected to photodetector D and receives, by virtue of appropriate filters (not shown), electrical signals corresponding to only the frequencies $f_1 = |f_2 - f_O|$ and $2f_1 = |2f_2 - 2f_O|$. A data processing system DV, e.g. a microprocessor equipped with an optical display unit, is connected to the analog/digital converter A/D for performing further digital signal processing, such as the formation of the quotient $A_1/A_2$ according to equation (2) or the display of the rate of rotation to be measured.

Figure 3:
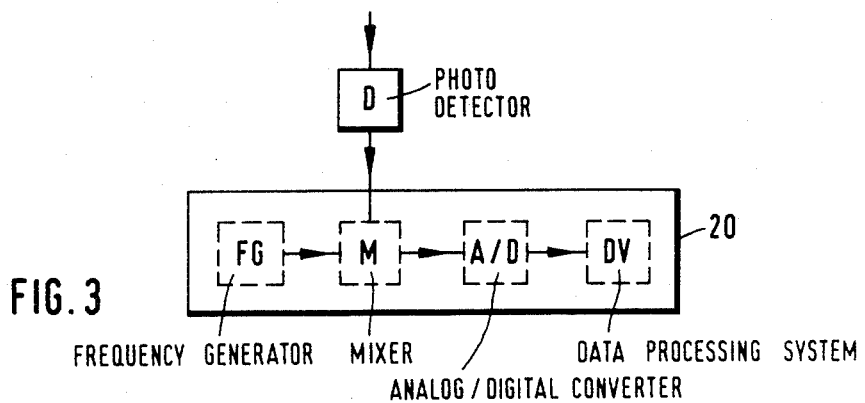
FIG. 3 is a partial schematic showing a modification of the light conductive fiber ring interferometer of FIG. 1 to provide an alternative embodiment of the invention.

If the light from light source Q is not or cannot be modulated, it is also possible, according to an alternative feature of the invention, to reduce the frequency to be processed by the analog/digital converter A/D by means of an electrical mixer. Such an embodiment is shown schematically in FIG. 3. FIG. 3 shows only the part of the measuring arrangement which is needed for purposes of explanation. According to FIG. 3, an electrical evaluation unit 20 is electrically connected behind photodetector D and includes a frequency generator FG, a mixer M, an analog/digital converter A/D, as well as a subsequently connected digital data processing system DV.

If now the electrical output signal of photodetector D, which essentially corresponds to the optical output signal, is mixed in mixer M with an electrical signal from frequency generator FG which contains signal components at frequencies $f_2$ and $2f_2$, the above described signal components at low frequencies suitable for further digital processing likewise result, so that with respect to the net effect, the mixer concept according to FIG. 3 corresponds to the intensity modulation of the light from light source Q in FIG. 2.

Slower digital processing is possible with the use of sample and hold circuits whereby the signal amplitudes $A_1/A_2$ are obtained at photodetector D according to a sampling rate rather than every period of the signal oscillation so that only a fraction of the signal periods are evaluated.

For the illustrated embodiment, a light conductive fiber coil having a fiber length of 850 m has been selected so that a fundamental frequency $f_O$ of 120 kHz results. A semiconductor laser, as light source Q, is actuated by means of a pulse generator PG which generates electrical pulses of a pulse length of 1 μs which are periodically repeated at a mixing frequency $f_2 = 118$ kHz. At photodetector D, which may comprise a photodiode, there then appears, inter alia, signal components at the evaluation frequency $f_1 = |f_2 - f_O| = 2$ kHz and its second harmonic $2f_1 = 4$ kHz. These signals are fed to analog/digital converter A/D which samples the signal 16,000 times per second. This corresponds to eight sampling values per period duration with respect to the evaluation frequency $f_1$. From these digital sampling values, $A_1$ and $A_2$ at frequencies $f_1$ and $2f_1$ are determined. The quotient $A_1/A_2$ may be calculated, from which, finally, the rate of rotation can be determined. In this way there results a very reliable rate of rotation determination. Moreover, scale factor fluctuations in the analog/digital converter A/D become negligible since they are eliminated by the abovementioned division calculation.

For precise evaluation of the electrical analog signal generated by photodetector D, it is of advantage to feed this analog signal initially to a so-called sample and hold circuit which takes only very short-time samples (dirac pulses) from the analog signal to be digitalized. These pulses are then converted into a so-called data word by analog/digital converter AD, operating, for example, according to the successive approximation principle. Such timely consecutive data words, e.g. 16 bit parallel words, contain amplitude and phase values of the analog signal in digital form and can be further processed by a data processing system, e.g. a microprocessor and/or an electronic, parallel operating, fast computer according to the above-mentioned equations.

It will be understood that the above description of the present invention is susceptible to various modifications, changes and adaptions, and the same are intended to be comprehended within the meaning and range of equivalents of the appended claims.

What is claimed is:

1. In a method for measuring absolute rotation with the aid of a light conductive fiber ring interferometer including a light source for producing a light beam, a light beam dividing arrangement, a light path connected to the beam dividing arrangement and formed by a light conductive fiber coil, an optical phase modulator disposed in the light path, and a photodetector; said method including dividing the light beam produced by the light source into two light beam signals by means of the beam dividing arrangement, feeding the two light beam signals to the respective ends of the light path to circulate the two light beam signals through the light path in opposite directions, phase modulating the light signals circulating in the light path with a periodic optical phase modulation at a fundamental frequency $f_O$, combining the light signals exiting from the two respective ends of the light path to provide a combined optical output signal, and detecting the combined optical output signal, by means of the photodetector, to provide an electrical output signal; the improvement comprising: modulating one of the group consisting of said light beam, said two light beam signals and said output signals with a mixing frequency $f_2$ such that an electrical evaluation signal having an evaluation frequency $f_1$ which is less than said fundamental frequency $f_O$ is produced on the output side of the photodetector; and evaluating said electrical evaluation signal to determine the absolute rotation.

2. A method according to claim 1 wherein said modulating step includes modulating the light circulating in the light path with said mixing frequency $f_2$ such that said electrical output signal produced by the photodetector contains said evaluation frequency $f_1$ and constitutes said electrical evaluation signal.

3. A method according to claim 1 wherein said modulating step includes modulating said electrical output signal of the photodetector with said mixing frequency $f_2$ such that an electrical signal is produced which has said evaluation frequency $f_1$ and which constitutes said electrical evaluation signal.

4. A method according to claim 2 or 3 wherein said periodic optical phase modulation is sinusoidal.

5. A method as defined in claim 2 or 3 including selecting said evaluation frequency $f_1$ such that said electrical evaluation signal can be evaluated by means of a digital data processing system.

6. A method as defined in claim 2 or 3 wherein said fundamental frequency $f_O$ substantially equals $1/(2\tau)$, where $\tau$ is the travel time difference of the light in the light path between the light travel time of each of said two light beam signals from the respective ends of the light path to the phase modulator.

7. A method as defined in claim 2 wherein: said modulating step comprises modulating the intensity of the light from the light source with a substantially periodic signal containing the mixing frequency $f_2$ such that said optical output signal contains signal components at the evaluation frequency $f_1 = |f_2 - f_0|$ and its harmonics; and said evaluating step includes utilizing the signal amplitude of at least one of said evaluation frequency $f_1$ and its harmonics.

8. A method as defined in claim 7 wherein: said modulating step comprises providing the intensity modulated light from the light source with at least components at the mixing frequency $f_2$ and its first harmonic $2f_2$; and said evaluating step includes evaluating a quotient formed of the signal amplitudes at the evaluation frequency $f_1 = |f_2 - f_0|$ and its first harmonic $2f_1$ in the optical output signal.

9. A method as defined in claim 7 wherein said modulating step comprises modulating the light source such that it emits light pulses which are substantially periodically repeated at the mixing frequency $f_2$.

10. A method as defined in claim 8 or 9 wherein the light source is a light emitting diode having an electrical actuating current and said modulating step further includes modulating the light intensity of the light emitting diode by modulating its electrical actuating current.

11. A method as defined in claim 8 or 9 wherein the light source is a semiconductor laser diode having an electrical actuating current and said modulating step further includes modulating the light intensity of the semiconductor laser diode by modulating its electrical actuating current.

12. A method as defined in claim 3 wherein: at least one electrical mixer is coupled to the photodetector and at least one frequency generator for generating a mixing electrical signal continuing components at said frequency $f_2$ and its harmonics is connected to the at least one mixer; and said modulating step comprises feeding both the electrical output signal of the photodetector and the mixing electrical signal from the at least one frequency generator to the at least one electrical mixer so that the electrical output signal of the mixer contains signal components including said evaluation frequency $f_1$ and its harmonics.

13. A circuit arrangement for measuring absolute rotation by means of a light conductive fiber ring interferometer, said arrangement comprising:
   a light source for emitting a beam of light;
   a beam dividing means for receiving the light beam emitted from said light source and dividing said beam into first and second light beams, said beam dividing means having first and second gates for passing said first and second light beams, respectively, and a separate light output gate;
   a light conductive fiber coil having fiber ends each being coupled to a respective one of said first and second gates of said beam dividing means, said fiber coil forming a light path and said first and second beams circulating through said light path and reentering said beam dividing means via said first and second gates;
   means contained within said beam dividing means for combining the first and second beams after circulating through the light path formed by the fiber coil and for producing an optical output signal at said separate light output gate;
   a phase modulator disposed in said light path formed by the fiber coil for modulating light circulating through said light path with a periodic optical phase modulation at a fundamental frequency $f_0$;
   a photodetector coupled to said separate light output gate of said beam dividing means for converting the optical output signal into an electrical evaluation signal;
   means coupled to said light source for modulating the intensity of said light beam emitted therefrom with a signal having a frequency $f_2$ such that the electrical evaluation signal produced by the photodetector has an evaluation frequency $f_1$ that is less than said fundamental frequency $f_0$ of said periodic optical phase modulation in the light path of said fiber coil;
   at least one analog to digital converter responsive to said electrical evaluation signal for producing a corresponding digital output signal; and
   a digital data processing means for evaluating the output of said analog to digital converter to determine the absolute rotation.

14. A circuit arrangement for measuring absolute rotation by means of a light conductive fiber ring interferometer, said arrangement comprising:
   a light source for emitting a beam of light;
   a beam dividing means for receiving the light beam emitted from said light source and dividing said beam into first and second light beams, said beam dividing means having first and second gates for passing said first and second light beams, respectively, and a separate light output gate;
   a light conductive fiber coil having fiber ends each being coupled to a respective one of said first and second gates of said beam dividing means, said fiber coil forming a light path and said first and second beams circulating through said light path and reentering said beam dividing means via said first and second gates;
   means contained within said beam dividing means for combining the first and second beams after circulating through the light path formed by the fiber coil and for producing an optical output signal at said separate light output gate;
   a phase modulator disposed in the light path formed by the fiber coil for modulating light circulating in said light path with a periodic optical phase modulation at a fundamental frequency $f_0$;
   a photodetector coupled to said separate light output gate of said beam dividing means for converting the optical output signal into an electrical output signal;
   means coupled to said photodetector for modulating the electrical output signal of said photodetector with a signal having a frequency $f_2$ such that an electrical evaluation signal is produced which has an evaluation frequency $f_1$ that is less than the fundamental frequency $f_0$ of said periodic optical phase modulation in the light path of said fiber coil;
   at least one analog to digital converter responsive to said electrical evaluation signal for producing a corresponding digital output signal; and
   a digital data processing means for evaluating the output of said analog to digital converter to determine the absolute rotation.

15. An arrangement as defined in claim 13 or 14 wherein said digital data processing means includes at least one microprocessor.

16. An arrangement as defined in claim 13 or 14 wherein said digital data processing means includes at least one parallel operating computer.

17. A method as defined in claim 13 or 14 wherein the light source is a light emitting diode.

18. A method as defined in claim 13 or 14 wherein the light source is a semiconductor laser diode.

* * * * *